(12) United States Patent
Furumiya

(10) Patent No.: US 8,111,599 B2
(45) Date of Patent: Feb. 7, 2012

(54) OPTICAL DISC DRIVE APPARATUS AND OPTICAL DISC REPRODUCTION METHOD USING THE SAME

(75) Inventor: Shigeru Furumiya, Hyogo (JP)

(73) Assignee: Panasonic Corporation, Osaka (JP)

( * ) Notice: Subject to any disclaimer, the term of this patent is extended or adjusted under 35 U.S.C. 154(b) by 837 days.

(21) Appl. No.: 12/089,172

(22) PCT Filed: Oct. 4, 2006

(86) PCT No.: PCT/JP2006/319860
§ 371 (c)(1),
(2), (4) Date: Apr. 3, 2008

(87) PCT Pub. No.: WO2007/043406
PCT Pub. Date: Apr. 19, 2007

(65) Prior Publication Data
US 2010/0172230 A1      Jul. 8, 2010

(30) Foreign Application Priority Data

Oct. 4, 2005  (JP) .................................. 2005-290692

(51) Int. Cl.
*G11B 7/00* (2006.01)
(52) U.S. Cl. .................... 369/47.49; 369/116; 369/47.5; 369/47.38; 369/53.3
(58) Field of Classification Search .................. None
See application file for complete search history.

(56) References Cited

U.S. PATENT DOCUMENTS

| | | |
|---|---|---|
| 4,819,242 A | 4/1989 | Kaku et al. |
| 5,467,337 A | 11/1995 | Matsumoto |
| 5,495,456 A | 2/1996 | Oka et al. |
| 5,572,155 A * | 11/1996 | Tamayama ...................... 327/94 |
| 6,011,663 A * | 1/2000 | Inoue et al. ..................... 360/48 |
| 6,013,959 A * | 1/2000 | Hoppie ....................... 310/12.23 |

(Continued)

FOREIGN PATENT DOCUMENTS

EP        0 614 176        9/1994

(Continued)

OTHER PUBLICATIONS

International Search Report issued Oct. 31, 2006 in the International (PCT) Application No. PCT/JP2006/319860.

(Continued)

*Primary Examiner* — Joseph Haley
*Assistant Examiner* — Ifedayo Iluyomade
(74) *Attorney, Agent, or Firm* — Wenderoth, Lind & Ponack, L.L.P.

(57) ABSTRACT

An optical disc drive apparatus (100) of the present invention rotates an optical disc (1) at a predetermined rotation speed using a motor (2). An optical pickup (3) irradiates the optical disc (1) with a laser beam (5) emitted from an internal semiconductor laser (4) included therein, and obtains a reproduction signal (7) based on a laser beam reflected from the optical disc (1). A laser driving unit (8) controls a driving current (9) of the semiconductor laser (4) to a predetermined level, and superimposes a high-frequency current (11) having a predetermined level on the driving current (9). In a high-speed reproduction mode, a control unit (12) sets the rotation speed of the optical disc (1) higher, the power of the laser beam (5) irradiating the optical disc (1) higher, and the level of the high-frequency current (11) lower than in a normal reproduction mode.

11 Claims, 4 Drawing Sheets

U.S. PATENT DOCUMENTS

| | | | |
|---|---|---|---|
| 6,031,959 A * | 2/2000 | Hamai et al. | 386/326 |
| 6,421,314 B1 * | 7/2002 | Maruyama | 369/116 |
| 6,567,440 B1 | 5/2003 | Hirata et al. | |
| 6,580,737 B1 | 6/2003 | Hirata et al. | |
| 6,731,584 B1 | 5/2004 | Nagara | |
| 7,038,989 B2 * | 5/2006 | Asada et al. | 369/59.11 |
| 7,406,012 B2 * | 7/2008 | Kamei | 369/53.18 |
| 7,768,885 B2 * | 8/2010 | Kitagaki et al. | 369/47.5 |
| 2001/0005390 A1 | 6/2001 | Hirata et al. | |
| 2005/0286392 A1 | 12/2005 | Kamei | |
| 2008/0279058 A1 * | 11/2008 | Sasaki et al. | 369/44.27 |

FOREIGN PATENT DOCUMENTS

| | | |
|---|---|---|
| EP | 0 645 766 | 3/1995 |
| EP | 1 626 399 | 2/2006 |
| JP | 62-119743 | 6/1987 |
| JP | 03-025732 | 2/1991 |
| JP | 11-54826 | 2/1999 |
| JP | 2001-14679 | 1/2001 |
| JP | 2003-289171 | 10/2003 |
| JP | 2006-221706 | 8/2006 |
| JP | 2006-303332 | 11/2006 |
| JP | 2007-4914 | 1/2007 |
| WO | 2004/038711 | 5/2004 |
| WO | 2004/105006 | 12/2004 |
| WO | 2007/145124 | 12/2007 |

OTHER PUBLICATIONS

European Search Report issued Oct. 29, 2008 in European Application No. 06 81 1200.

* cited by examiner

| Reproduction mode | Normal speed | 4X speed | 8X speed |
|---|---|---|---|
| High-frequency superimposition ON | 0.6 mW | 0.8 mW | 1.0 mW |
| High-frequency superimposition OFF | 0.7 mW | 1.0 mW | 1.2 mW |

Fig. 3

OPTICAL DISC DRIVE APPARATUS AND OPTICAL DISC REPRODUCTION METHOD USING THE SAME

BACKGROUND OF THE INVENTION

1. Field of Invention

The present invention relates to an optical disc drive apparatus, and more particularly, to high-speed reproduction of an optical disc using the optical disc drive apparatus.

2. Description of the Related Art

A conventional optical disc drive apparatus uses a semiconductor laser as a light source of its optical pickup. The power of a semiconductor laser that is used to reproduce data from an optical disc (reproduction power) is typically low. Thus, returned light or changes in the power of the semiconductor laser beam due to variation in the temperature of the semiconductor laser are not negligible. This causes relatively large noise to be generated in reproduction signals of the optical pickup. To reduce such noise in the reproduction signals, a high-frequency current may be superimposed on a laser driving current. The semiconductor laser is stabilized during reproduction of the optical disc by controlling the intensity and frequency of the high-frequency current. As a result, the noise in the reproduction signals is reduced (see, for example, Patent Document 1).

The driving current of the semiconductor laser is set low particularly when data is to be reproduced from a recordable or rewritable optical disc. This sets the reproduction power to such a level that signals recorded on the optical disc are not erased by the energy of the laser beam irradiating the optical disc (see, for example, Patent Document 2).

Patent Document 1: Japanese Unexamined Patent Publication No. H11-54826.

Patent Document 2: Japanese Unexamined Patent Publication No. 2001-14679.

BRIEF SUMMARY OF THE INVENTION

Problems to be Solved by Invention

In recent years, optical disc drive apparatuses that record and reproduce data to and from optical discs have been developed to record and reproduce at speeds many times higher than normal speeds. To achieve higher-speed recording and reproduction of data, optical disc drive apparatuses are required to rotate an optical disc at a higher speed, to use a signal processing circuit that has a wider frequency band, and to use a semiconductor laser that has a higher output. However, conventional optical disc drive apparatuses have difficulties in reproducing data at such higher speeds for the reasons described below.

A signal processing circuit typically has greater noise in its output as its clock frequency has a wider frequency band. Therefore, when the signal processing circuit has a wide frequency band, the S/N ratio (signal-to-noise ratio) required to reproduce data with a high quality is difficult to realize. As one method to improve the S/N ratio, the reproduction power of the optical disc drive apparatus may be set high. In such a case, the level of a reproduction signal rises with respect to the level of noise. This in principle improves the S/N ratio. However, if the reproduction power is set too high with respect to a recordable or rewritable optical disc, signals recorded on the optical disc may be erased even during the reproduction operation. In particular, the power of the laser beam has a high peak when a high-frequency current has been superimposed on the laser driving current. To prevent signals recorded on the optical disc from being erased, the reproduction power needs to be set high but not to exceed a value 1.5 times the normal reproduction power. Therefore, improving the S/N ratio solely by increasing the reproduction power is substantially unrealistic.

The frequency of a reproduction signal that is read from a rapidly rotating optical disc is higher as the optical disc rotates at a higher speed. Here, the reproduction signal typically contains a high-frequency component, whose frequency is about twice the frequency of a shortest mark signal. When the frequency of such a high-frequency component is as high as about half of the frequency of the high-frequency current that has been superimposed on the laser driving current, a high-frequency component that appears in the reproduction signal in association with the superimposed high-frequency current may interfere with the inherent high-frequency component of the reproduction signal (such interference may generate aliasing noise). This may lower the quality of the reproduction signal. To prevent such interference, for example, the frequency of a high-frequency current may be raised in accordance with a higher speed of the optical disc rotation. However, the frequency of the high-frequency current, which is superimposed on the laser driving current to reduce noise in the reproduction signal, has already been optimized according to the level of noise of the reproduction signal that the high-frequency current intends to reduce. Moreover, when the frequency of the high-frequency current is set higher than or as high as the frequency of the high-frequency current used in the conventional optical disc drive apparatus, the optical disc drive apparatus will have difficulties in reducing its consumption power further or in reducing its EMI (Electro Magnetic Interference) further. Thus, it is substantially difficult to raise the frequency of a high-frequency current in accordance with the speed of the optical disc rotation.

It is an object of the present invention to provide an optical disc drive apparatus that improves the S/N ratio during high-speed reproduction of an optical disc and enables data to be reproduced with a high quality through high-speed reproduction of the optical disc.

Means for Solving Problems

An optical disc drive apparatus of the present invention rotates an optical disc on which information is recorded at a predetermined rotation speed, superimposes a high-frequency component having a predetermined level on a laser beam having a predetermined power and irradiates the optical disc with the laser beam, and obtains a reproduction signal based on a laser beam reflected from the optical disc. This optical disc drive apparatus particularly sets (preferably using an internal integrated circuit) the rotation speed of the optical disc higher in a high-speed reproduction mode than in a normal reproduction mode, sets the power of the laser beam that is used to irradiate the optical disc higher in the high-speed reproduction mode than in the normal reproduction mode, and sets the level of the high-frequency component to be superimposed on the laser beam used to irradiate the optical disc lower in the high-speed reproduction mode than in the normal reproduction mode. It is more preferable that the optical disc drive apparatus sets the level of the high-frequency component to zero in the high-speed reproduction mode. More specifically, the optical disc drive apparatus sets the level of the high-frequency component to be superimposed on the laser beam low or eliminates the high-frequency component in the high-speed reproduction mode. As a result, even when the reproduction target optical disc is a recordable or rewritable optical disc, the reproduction power is set as high as to a value close to an upper limit value at which recorded signals are not erased. This improves the S/N ratio to a satisfactory high level. Further, the high-frequency component to be superimposed on the laser beam is set low during high-speed reproduction. In this case, interference (aliasing noise) occurring between a high-frequency component of a reproduction signal appearing in association with the superimposed high-frequency component and an inherent high-frequency component of the reproduction signal is sufficiently negligible. As a result, the reproduction signal in high-speed reproduction will have a higher quality.

The optical disc drive apparatus of the present invention preferably includes a motor operable to rotate the optical disc at the predetermined rotation speed, an optical pickup including a semiconductor laser as a light source and operable to irradiate the optical disc with the laser beam and obtain the reproduction signal based on the laser beam reflected from the optical disc, a laser driving unit operable to control a driving current of the semiconductor laser to a predetermined level and superimpose the high-frequency current having the predetermined level on the driving current, and a control unit operable to control the motor and the laser driving unit, and set the rotation speed of the optical disc higher in the high-speed reproduction mode than in the normal reproduction mode, and set the level of the driving current of the semiconductor laser higher in the high-speed reproduction mode than in the normal reproduction mode, and set the level of the high-frequency current lower in the high-speed reproduction mode than in the normal reproduction mode. More preferably, the control unit sets the high-frequency current to ON in the normal reproduction mode and sets the high-frequency current to OFF in the high-speed reproduction mode. Here, the laser driving unit may include a high-frequency superimposition circuit operable to superimpose the high-frequency current on the driving current of the semiconductor laser.

The optical disc drive apparatus of the present invention may further include a linear speed detection unit operable to detect a linear speed of a spot of the laser beam irradiating the optical disc. In that case, the control unit preferably controls the laser driving unit based on the linear speed detected by the linear speed detection unit. This optimizes the reproduction power in real time according to the actual rotation speed of the optical disc when, for example, the reproduction mode of the optical disc drive apparatus is switched between the normal reproduction mode and the high-speed reproduction mode. This prevents signals recorded on the optical disc from being erroneously erased, reliably improves the S/N ratio to a satisfactory high level, and further reliably prevents aliasing noise from being generated.

Effects of Invention

As described above, the optical disc drive apparatus of the present invention sets the high-frequency current that is superimposed on the driving current of the semiconductor laser lower in the high-speed reproduction mode in accordance with the increase of the optical disc rotation speed. This structure raises the highest possible reproduction power to a level close to an upper limit value at which signals recorded on the optical disc are not erased. This optical disc drive apparatus can set the reproduction power higher than the conventional apparatus. As a result, the optical disc drive apparatus improves the S/N ratio more than the conventional apparatus. Further, the high-frequency component to be superimposed is set lower during high-speed reproduction to reduce its negative effect on the reproduction signal. As a result, the optical disc drive apparatus achieves higher-speed reproduction while maintaining the high quality of the reproduction signal. The optical disc drive apparatus of the present invention is particularly useful when used as, for example, a high-performance external storage device of a computer or a video recorder device that can record and reproduce data at a high speed.

BRIEF DESCRIPTION OF DRAWINGS

FIG. 3 is a table showing examples of the reproduction power values set in embodiments of the present invention.

DETAILED DESCRIPTION OF THE INVENTION

Preferred embodiments of the present invention will now be described with reference to the drawings.

First Embodiment

Figure 1:
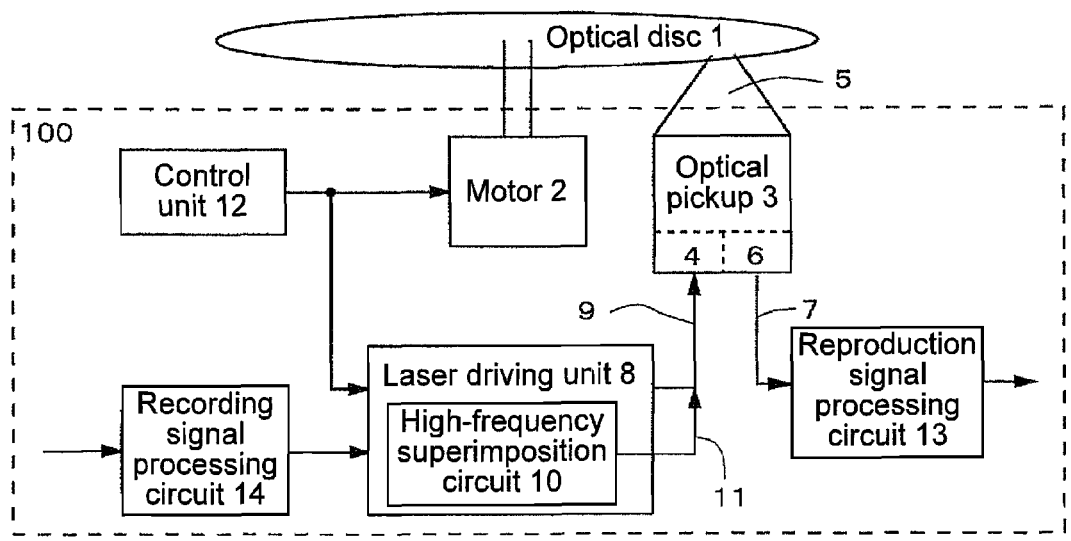
FIG. 1 is a block diagram of an optical disc drive apparatus according to an embodiment of the present invention.

FIG. 1 is a block diagram of an optical disc drive apparatus according to a first embodiment of the present invention. An optical disc drive apparatus 100 rotates an optical disc 1, on which information has been recorded, at a predetermined rotation speed using a motor 2. An optical pickup 3 has a semiconductor laser 4, which is mounted thereon as its light source, and irradiates the rotating optical disc 1 with a laser beam 5 emitted from the semiconductor laser 4. A laser driving unit 8 supplies a driving current 9 to the semiconductor laser 4, and adjusts the average value of the power of the laser beam 5, which is used to irradiate the optical disc 1, to a predetermined power value. The laser driving unit 8 further includes a high-frequency superimposition circuit 10. The high-frequency superimposition circuit 10 superimposes a high-frequency current 11 having a predetermined level and a predetermined frequency on the driving current 9, which is supplied to the semiconductor laser 4. A control unit 12 sets a predetermined rotation speed for the motor 2, and sets, for the laser driving unit 8, the power of the semiconductor laser 4 and the level and frequency of the high-frequency current 11 to values determined according to the rotation speed of the optical disc 1. In particular, when the rotation speed of the optical disc 1 is low, superimposing the high-frequency current 11 will stabilize the semiconductor laser 4, and will reduce noise in the laser beam 5, which is used to irradiate the optical disc 1. Preferably, a MPU (micro processing unit), which is formed using an integrated circuit, functions as the control unit 12 by executing programs such as microcode programs. The laser driving unit 8 may also be realized by software, or more specifically, by the same MPU as the MPU used for the control unit 12. Alternatively, the laser driving unit 8 and the control unit 12 may be separately realized by hardware, or may be integrated on the single chip. The optical pickup 3 uses a photodetector 6 to detect a laser beam reflected from the spot of the laser beam 5 that has been focused on the optical disc 1, and converts the detected laser beam to an electric signal (reproduction signal) 7. A reproduction signal processing circuit 13 demodulates data that has been recorded on the optical disc 1 based on the reproduction signal 7.

The optical disc drive apparatus 100 according to the first embodiment preferably functions not only to reproduce data but also to record data on an optical disc. More specifically, the optical disc drive apparatus 100 further includes a recording signal processing circuit 14. When the optical disc 1 is recordable or rewritable, the recording signal processing circuit 14 controls the laser driving unit 8 according to a recording signal input from an external circuit. As a result, the power of the laser beam 5, which is emitted from the optical pickup 3 and irradiates the optical disc 1, is modulated according to the recording signal, and data represented by the recording signal is recorded onto the optical disc 1. Alternatively, the optical disc drive apparatus may have a reproduction-only function. In this case, the optical disc drive apparatus 100 may not include the recording signal processing circuit 14.

A more specific example is given assuming that the optical disc 1 is a dual-layer Blu-ray disc (with a capacity of 50 GB), which is recordable using a blue laser beam.

A normal reproduction mode will be described first. The control unit 12 sets the rotation speed for the motor 2 to adjust the linear speed at which the spot of the laser beam 5, which has been focused on the optical disc 1, scans on the optical disc 1 to 4.92 m/s. The control unit 12 turns on the high-frequency superimposition circuit 10, and sets the frequency of the high-frequency current 11 to 400 MHz. The control unit 12 further sets, for the laser driving unit 8, the level of the driving current 9 to adjust the average value of the power of the laser beam 5 to 0.6 mW.

A high-speed reproduction mode will be described next. The control unit 12 sets the rotation speed for the motor 2 to adjust the linear speed at which the spot of the laser beam 5, which has been focused on the optical disc 1, scans on the optical disc 1 to the speed four times the linear speed set in the normal reproduction mode (to 19.68 m/s). The control unit 12 sets, for the high-frequency superimposition circuit 10, the level of the high-frequency current 11 to the level lower than the level of the high-frequency current 11 set in the normal reproduction mode. More preferably, the control unit 12 turns off the high-frequency superimposition circuit 10 to set the level of the high-frequency current 11 to zero. The control unit 12 further sets, for the laser driving unit 8, the level of the driving current 9 to adjust the average value of the power of the laser beam 5 to 1.0 mW, which is higher than the average value of the power set in the normal reproduction mode.

Figure 2:
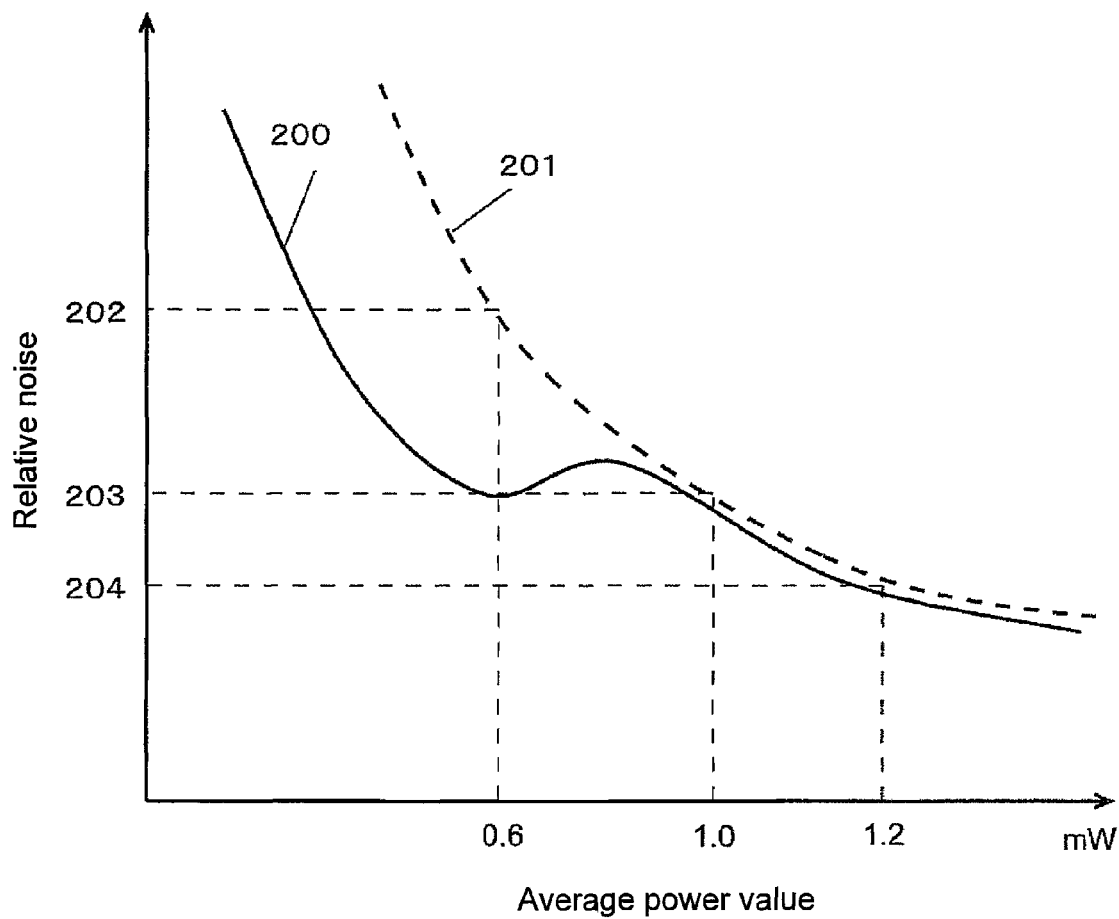
FIG. 2 is a characteristic diagram showing relative noise of a semiconductor laser in the embodiment of the present invention.

To explain that the setting described above effectively solves the problems to be solved by the present invention, the relationship between the power of the semiconductor laser 4 and the resulting noise will be described. The characteristic diagram of FIG. 2 shows the relationship between the average value of the power of the laser beam 5, which is emitted from the semiconductor laser 4 and irradiates the optical disc 1 during reproduction of the optical disc 1, and the relative noise contained in the laser beam 5. In FIG. 2, a curve 200 drawn with a solid line represents the noise as a function of the average power value when the high-frequency superimposition circuit 10 is ON, and a curve 201 drawn with a broken line represents the noise as a function of the average power value when the high-frequency superimposition circuit 10 is OFF. In FIG. 2, the horizontal axis indicates the average power value of the laser beam 5, whereas the vertical axis indicates the relative noise (e.g., the noise level per unit power value) contained in the laser beam 5. As is clear from FIG. 2, the relative noise decreases as the power of the laser beam 5 increases (e.g., the characteristic curve 201 shows that the relative noise decreases from the noise level 202, the noise level 203, and to the noise level 204 when the average power value increases from 0.6 mW, 1.0 mW, and to 1.2 mW). Moreover, when the power of the laser beam 5 is relatively low, the characteristic curve 200 shows that an extremely small value appears as a result of turning on the high-frequency superimposition circuit 10 and causes the relative noise to drop significantly (the relative noise is at the level 202 during the off state of the high-frequency superimposition circuit 10 whereas the relative noise drops to the level 203 during the on state of the high-frequency superimposition circuit 10 when, for example, the average power value of the laser beam 5 is around 0.6 mW). When the power of the laser beam 5 is relatively high, the relative noise during the ON state of the high-frequency superimposition circuit 10 and the relative noise during the OFF state of the high-frequency superimposition circuit 10 have little difference between them (e.g., a difference between the relative noise represented by the characteristic curve 200 and the relative noise represented by the characteristic curve 201 is sufficiently negligible when the average power value of the laser beam 5 is around 1.2 mW although the difference is not negligible when the average power value of the laser beam 5 is around 0.6 mW). Although not shown in FIG. 2, the waveform of the laser beam 5 contains a sharp peak called relaxation oscillation when the high-frequency superimposition circuit 10 is ON. When, for example, the average power value of the laser beam 5 is 1.0 mW, the waveform of the laser beam 5 contains such a relaxation oscillation peak of as high as about 7.0 mW. In contrast, when the high-frequency superimposition circuit 10 is OFF, the average value and the peak value of the waveform of the laser beam 5 are substantially equal to each other (e.g., the peak value is 1.0 mW when the average of the laser beam 5 is 1.0 mW).

The optical disc drive apparatus of the first embodiment sets the reproduction power to a value at which turning on the high-frequency superimposition circuit 10 will effectively reduce the relative noise (e.g., to 0.6 mW in FIG. 2) in the normal reproduction mode (in which normal speed reproduction is preferably performed). This setting reduces the relative noise in the normal reproduction mode, and keeps the S/N ratio of the reproduction signal processing circuit 13 at a high level. In the high-speed reproduction mode (in which 4× speed reproduction is preferably performed), the reproduction power is set to a value, which is higher than the reproduction power set in the normal reproduction mode (0.6 mW), at which the relative noise during the ON state of the high-frequency superimposition circuit 10 and the relative noise during the OFF state of the high-frequency superimposition circuit 10 have little difference between them (to a value of, for example, 1.2 mW in FIG. 2). Here, if the high-frequency superimposition circuit 10 is maintained to be on, then the resulting sharp peak of the laser beam 5, which is associated with relaxation oscillation, may cause information recorded on the optical disc 1 to be erased during reproduction of the optical disc 1 (this is referred to as "reproduction erasure"). The conventional apparatus maintains the high-frequency superimposition circuit 10 to be ON even during 4× speed reproduction, and increases the average value of the power of the laser beam 5 only to about 0.8 mW. In contrast, the apparatus of the first embodiment of the present invention lowers the level of the high-frequency current 11 during 4× speed reproduction to a level lower than the level of the high-frequency current 11 set during normal reproduction, and reduces the sharpness of the above sharp peak of the laser beam 5 (or more preferably removes the sharp peak of the laser beam 5 by turning off the high-frequency superimposition circuit 10). As a result, the apparatus of the first embodiment prevents the reproduction erasure from occurring on the optical disc 1 even when the reproduction power is increased in the high-speed reproduction mode to a value 1.5 times the reproduction power set in the normal reproduction mode or to an even higher value (to about 1.0 mW). Further, the relative noise contained in the laser beam 5 is low. In this case, the S/N ratio is improved to a satisfactory high level by increasing the reproduction power. As described above, the setting in the high-speed reproduction mode according to the first embodiment improves the S/N ratio of the reproduction signal processing circuit 13 and prevents the reproduction erasure from occurring on the optical disc 1.

Second Embodiment

An optical disc drive apparatus according to a second embodiment of the present invention differs from the apparatus according to the first embodiment in its reproduction condition used in the high-speed reproduction mode. The other structure of the optical disc drive apparatus according to the second embodiment of the present invention is identical to the corresponding structure of the apparatus of the first embodiment, and will not be described in detail in the present embodiment.

The optical disc drive apparatus of the second embodiment uses the same setting as the setting used in the apparatus of the first embodiment in the normal reproduction mode. More specifically, the control unit 12 sets the rotation speed for the motor 2 to adjust the linear speed at which the spot of the laser beam 5, which has been focused on the optical disc 1, scans on the optical disc 1 to 4.92 m/s. The control unit 12 turns on the high-frequency superimposition circuit 10 and sets the frequency of the high-frequency current 11 to 400 MHz. The control unit 12 further sets, for the laser driving unit 8, the level of the driving current 9 to adjust the average power value of the laser beam 5 to 0.6 mW.

In the high-speed reproduction mode, the control unit 12 sets the rotation speed for the motor 2 to adjust the linear speed at which the spot of the laser beam 5, which has been focused on the optical disc 1, scans on the optical disc 1 to the speed eight times the linear speed set in the normal reproduction mode (to 39.36 m/s). The control unit 12 further sets, for the high-frequency superimposition circuit 10, the level of the high-frequency current 11 to the level lower than the level set in the normal reproduction mode. More preferably, the control unit 12 turns off the high-frequency superimposition circuit 10, and sets the level of the high-frequency current 11 to zero. The control unit 12 further sets, for the laser driving unit 8, the level of the driving current 9 to adjust the average power value of the laser beam 5 to 1.2 mW, which is higher than the average power value set in the normal reproduction mode. FIG. 3 shows examples of the reproduction power values set in the different reproduction modes for the optical disc drive apparatus of the first embodiment as well as for the apparatus of the second embodiment.

To explain that the setting described above effectively solves the problems to be solved by the present invention, the relationship between the frequency component of the reproduction signal 7 and the frequency of the high-frequency current 11 will be described. The reproduction signal 7, which is read from the optical disc 1, typically contains a high-frequency component, which is about 1.5 to 2 times the frequency of a shortest mark signal. To enable data to be reproduced with a high quality, the reproduction signal 7 needs to be processed without degrading its high-frequency component. When, for example, the optical disc 1 is a Blu-ray disc, the reproduction signal 7 in the normal reproduction mode contains an inherent frequency component of 20 to 30 MHz, which is based on the signals recorded on the optical disc 1 and which is equal to or higher than a value 1.5 times the frequency of 16.5 MHz of a shortest mark signal of the optical disc 1. When a high-frequency current 11 having a high level is superimposed on the driving current 9 of the semiconductor laser 4, the laser beam 5 substantially blinks at the frequency of the high-frequency current 11. Thus, the sampling frequency of an actual reproduction signal 7 output from the optical pickup 3 is the frequency of the high-frequency current 11. According to the Nyquist-Shannon sampling theorem, the sampling frequency typically needs to be at least two times the frequency component of information contained in an input signal to sample the input signal without degrading the information. To prevent the reproduction signal 7 from being degraded by sampling, the frequency of the high-frequency current 11 needs to be set at least two times the frequency of the reproduction signal 7, and also needs to be set at least four times the frequency of the shortest mark signal recorded on the optical disc 1. When the Blu-ray disc as the optical disc 1 is subjected to 8× speed reproduction, the reproduction signal 7 contains a high-frequency component of 160 to 240 MHz based on a signal recorded on the optical disc 1. When the frequency of the high-frequency current 11 is about 400 MHz, a high-frequency component superimposed on the reproduction signal 7 in association with the high-frequency current 11 interferes with an inherent high-frequency component contained in the reproduction signal from the signal recorded on the optical disc 1. As a result, the reproduction signal 7 is degraded (or aliasing noise is generated).

The optical disc drive apparatus of the second embodiment of the present invention performs reproduction in the high-speed reproduction mode at the speed as high as eight times the reproduction speed of the normal reproduction mode. Thus, the signal processing circuit (e.g., the reproduction signal processing circuit 13) having a wide frequency band corresponding to such high-speed reproduction inevitably has a high level of noise in its output. To reduce such noise, the reproduction power needs to be set higher during the 8× speed reproduction. However, the conventional optical disc drive apparatus, which maintains the high-frequency superimposition circuit 10 to be ON, can increase the reproduction power only to about 1.0 mW. The conventional optical disc apparatus can improve the S/N ratio to a certain level but not to a satisfactory high level. In contrast, the optical disc drive apparatus of the second embodiment of the present invention sets the level of the high-frequency current 11 lower in the high-speed reproduction mode than in the normal reproduction mode (more preferably turns off the high-frequency superimposition circuit 10). This sets the reproduction power in the high-speed reproduction mode to a value two times the reproduction power set in the normal reproduction mode (to 1.2 mW). The optical disc drive apparatus of the second embodiment consequently improves the S/N ratio by 6 dB. With this structure, the optical disc drive apparatus of the second embodiment enables data to be reproduced with a higher quality through high-speed reproduction. Further, the high-frequency current 11 is set low in the high-speed reproduction mode (preferably set to zero) and the laser beam 5 blinks little at that frequency. The little blinking of the laser beam 5 (i.e., sampling) does not degrade the reproduction signal 7 (does not generate aliasing noise).

Third Embodiment

Figure 4:
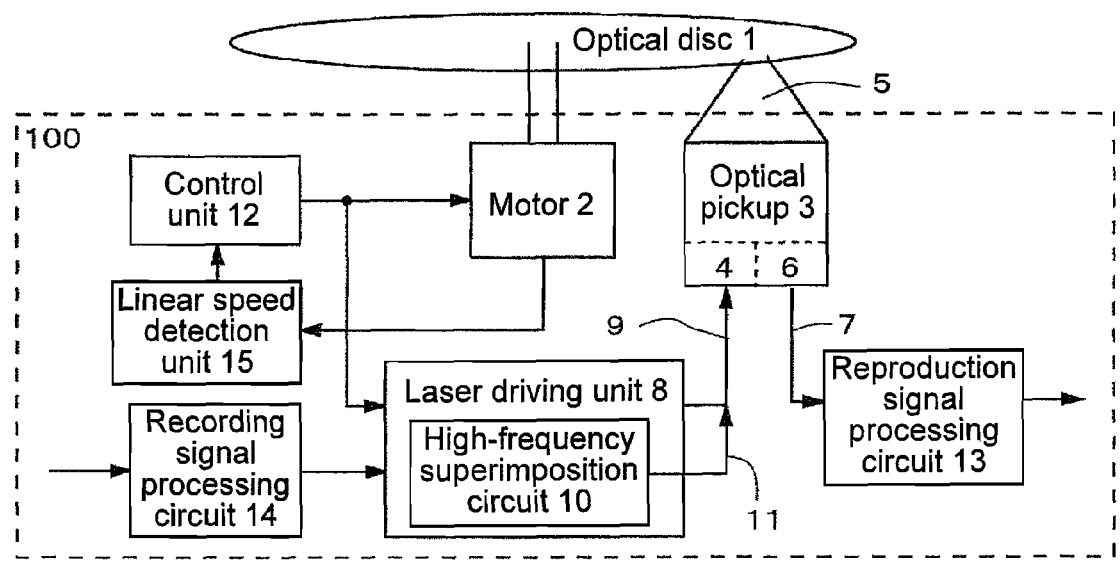
FIG. 4 is a block diagram of an optical disc drive apparatus according to another embodiment of the present invention.

An optical disc drive apparatus according to a third embodiment of the present invention differs from the apparatus according to the first embodiment in additionally including a linear speed detection unit 15 as shown in FIG. 4. The other structure of the optical disc drive apparatus according to the third embodiment of the present invention is identical to the corresponding structure of the apparatus of the first embodiment, and will not be described in detail in the present embodiment.

The linear speed detection unit 15 detects the linear speed of the spot of the laser beam 5, which illuminates the optical disc 1. More specifically, the linear speed detection unit 15 preferably detects the actual rotation speed of the motor 2, and calculates the linear speed based on the detected rotation speed. Alternatively, the linear speed detection unit 15 may calculate the linear speed based on servo information detected by a servo control circuit (not shown) of the optical pickup 3. More preferably, the control unit 12 controls the laser driving unit 8 based on the linear speed detected by the linear speed detection unit 15. As a result, when the reproduction mode of the optical disc drive apparatus is switched between the normal reproduction mode and the high-speed reproduction mode, the reproduction power of the laser beam 5 is optimized in real time according to the actual rotation speed of the optical disc 1. As a result, the optical disc drive apparatus of the third embodiment reliably prevents the reproduction erasure from occurring on the optical disc 1, reliably maintains the S/N ratio to be high for the reproduction signal processing circuit 13, and further reliably prevents aliasing noise from being generated in the reproduction signal 7.

The above embodiments of the present invention describe, as specific examples, their reproduction conditions used when the optical disc 1 is a recordable Blu-ray disc. However, the application of the present invention should not be limited to such reproduction conditions. More specifically, the present invention is applicable to optical disc drive apparatuses that differ from the above optical disc drive apparatuses in, for example, the ratio of the reproduction speed or the reproduction power set in the normal reproduction mode and in the high-speed reproduction mode, or in the relationship between the frequency of the high-frequency current 11 and the frequency of the shortest mark signal, or is also applicable to other typical optical discs. For example, the present invention is obviously applicable to an apparatus that reproduces data from a rewritable optical disc. The present invention, which has the advantageous effects of improving the S/N ratio and preventing EMI (Electro Magnetic Interference) associated with high-frequency superimposition, is applicable even to an optical disc apparatus that sets a high-speed reproduction mode for a read-only optical disc, which has no possibility of the reproduction erasure. In this way, application of the present invention should not be limited.

INDUSTRIAL APPLICABILITY

The present invention relates to the optical disc drive apparatus and is useful in high-speed reproduction of an optical disc as described above. Therefore, the present invention is obviously industrially applicable.

The invention claimed is:

1. An optical disc drive apparatus operable to:
   rotate an optical disc, onto which information is recorded, at a predetermined rotation speed;
   superimpose a high-frequency component, having a predetermined level, onto a laser beam having a predetermined power;
   irradiate the optical disc with the laser beam; and
   obtain a reproduction signal based on a reflected laser beam reflected from the optical disc,
   wherein the predetermined rotation speed of the optical disc is set higher in a high-speed reproduction mode than in a normal reproduction mode,
   wherein the predetermined power of the laser beam that is used to irradiate the optical disc is set higher in the high-speed reproduction mode than in the normal reproduction mode, and
   wherein the predetermined level of the high-frequency component is set lower in the high-speed reproduction mode than in the normal reproduction mode.

2. The optical disc drive apparatus according to claim 1, wherein the predetermined level of the high-frequency component is set to zero in the high-speed reproduction mode.

3. The optical disc drive apparatus according to claim 1, comprising:
   a motor operable to rotate the optical disc at the predetermined rotation speed;
   an optical pickup including a semiconductor laser as a light source and operable to irradiate the optical disc with the laser beam and obtain the reproduction signal based on the reflected laser beam reflected from the optical disc;
   a laser driving unit operable to control a driving current of the semiconductor laser to a predetermined level and superimpose a high-frequency current having a predetermined level onto the driving current; and
   a control unit operable to (i) control the motor and the laser driving unit, (ii) set the predetermined rotation speed of the optical disc higher in the high-speed reproduction mode than in the normal reproduction mode, (iii) set the predetermined level of the driving current higher in the high-speed reproduction mode than in the normal reproduction mode, and (iv) set the predetermined level of the high-frequency current lower in the high-speed reproduction mode than in the normal reproduction mode.

4. The optical disc drive apparatus according to claim 3, wherein the control unit is operable to set the high-frequency current to ON in the normal reproduction mode and set the high-frequency current to OFF in the high-speed reproduction mode.

5. The optical disc drive apparatus according to claim 3, wherein the laser driving unit includes a high-frequency superimposition circuit operable to superimpose the high-frequency current onto the driving current.

6. The optical disc drive apparatus according to claim 3, further comprising a linear speed detection unit operable to detect a linear speed of a spot of the laser beam irradiating the optical disc,
   wherein the control unit controls the laser driving unit based on the linear speed detected by the linear speed detection unit.

7. The optical disc drive apparatus according to claim 1, wherein a linear speed of a spot of the laser beam irradiating the optical disc in the high-speed reproduction mode is greater than or equal to a value four times a linear speed of a spot of the laser beam irradiating the optical disc in the normal reproduction mode.

8. The optical disc drive apparatus according to claim 1, wherein the predetermined power of the laser beam irradiating the optical disc in the high-speed reproduction mode is greater than or equal to a value 1.5 times the predetermined power of the laser beam irradiating the optical disc in the normal reproduction mode.

9. The optical disc drive apparatus according to claim 1, wherein a frequency of the high-frequency component does not exceed a value four times a frequency of a shortest mark signal contained in the reproduction signal in the high-speed reproduction mode.

10. An integrated circuit mounted on an optical disc drive apparatus operable to:
rotate an optical disc, onto which information is recorded, at a predetermined rotation speed;
superimpose a high-frequency component, having a predetermined level, onto a laser beam having a predetermined power;
irradiate the optical disc with the laser beam; and
obtain a reproduction signal based on a reflected laser beam reflected from the optical disc,
wherein the predetermined rotation speed of the optical disc is set higher in a high-speed reproduction mode than in a normal reproduction mode,
wherein the predetermined power of the laser beam that is used to irradiate the optical disc is set higher in the high-speed reproduction mode than in the normal reproduction mode, and
wherein the predetermined level of the high-frequency component is set lower in the high-speed reproduction mode than in the normal reproduction mode.

11. An optical disc reproduction method comprising:
rotating an optical disc, onto which information is recorded, at a predetermined rotation speed;
superimposing a high-frequency component, having a predetermined level, onto a laser beam having a predetermined power;
irradiating the optical disc with the laser beam; and
obtaining a reproduction signal based on a reflected laser beam reflected from the optical disc,
wherein the predetermined rotation speed of the optical disc is set higher in a high-speed reproduction mode than in a normal reproduction mode,
wherein the predetermined power of the laser beam that is used to irradiate the optical disc is set higher in the high-speed reproduction mode than in the normal reproduction mode, and
wherein the predetermined level of the high-frequency component is set lower in the high-speed reproduction mode than in the normal reproduction mode.

* * * * *